(12) United States Patent
Rückert

(10) Patent No.: US 6,404,187 B1
(45) Date of Patent: Jun. 11, 2002

(54) ACTUATOR/SENSOR ASSEMBLY

(75) Inventor: Dieter Rückert, Reilingen (DE)

(73) Assignee: Deere & Company, Moline, IL (US)

( * ) Notice: Subject to any disclaimer, the term of this patent is extended or adjusted under 35 U.S.C. 154(b) by 93 days.

(21) Appl. No.: 09/624,953

(22) Filed: Jul. 25, 2000

(30) Foreign Application Priority Data

Jul. 31, 1999 (DE) .......................... 199 36 265

(51) Int. Cl.$^7$ ................................. G01B 7/30
(52) U.S. Cl. ..................... 324/207.2; 324/207.25; 74/473.12
(58) Field of Search ................ 324/207.11, 207.13, 324/207.14, 207.2, 207.21, 207.25, 260; 338/32 H; 74/473.12, 543, 548; 200/564, 567

(56) References Cited

U.S. PATENT DOCUMENTS 4,896,558 A  1/1990  Meier et al. ................. 74/543

FOREIGN PATENT DOCUMENTS

CH       647 053      12/1984
DE       2 049 390    4/1972

Primary Examiner—Jay Patidar

(57) ABSTRACT

An actuator/sensor assembly is mounted on a housing of an operating handle. The assembly includes a sensor with a sensor casing, from which protrudes a rotatable sensor shaft. The sensor casing includes a threaded section which extends concentric to the sensor shaft and which is inserted into an opening in the housing. A bearing member is screwed onto the threaded section to clamp the housing between the sensor casing and the bearing member and fix the sensor to the housing. The actuator, such as a control knob, is coupled to the sensor shaft by a coupler. The actuator is rotatably supported on the bearing member and consequently on the housing. Transverse forces acting upon the knob are absorbed by the bearing member and transmitted to the housing so that the sensor shaft is not subject to lateral forces from the knob. The coupler transmits rotational movements from the knob to the sensor shaft and allows for misalignment between the knob and the sensor shaft.

15 Claims, 2 Drawing Sheets

ACTUATOR/SENSOR ASSEMBLY

BACKGROUND OF THE INVENTION

The invention pertains to an actuator/sensor assembly, and more particularly, to an actuator/sensor assembly which is mounted on a housing and having an actuator coupled to a sensor having a sensor shaft, and which may be mounted in an operating handle for a motor vehicle control.

There are numerous known sensors or detecting elements which can be mounted in housings. Rotary sensors generate signals which correspond to the rotary position of a sensor shaft. Such a sensor may be actuated by an actuator, such as a manually operated control knob directly mounted on the sensor shaft. However, such a direct connection is not always suitable or desirable for various reasons.

Swiss Patent Specification 647 053 describes a coupling between rotational bodies that are arranged in two different parts of a housing. The first rotational body consists of a roller that is arranged in an inner housing, with the rotational position of said roller being converted into electric data. The second rotational body consists of a shaft that is arranged in an upper housing, with a control knob being arranged on the end of the shaft which protrudes from the housing. The shaft is interlocked with the roller by means of a coupling. The coupling is composed of two parts. A first part of the coupling consists of a pin that is recessed into the roller and that is parallel and eccentric to the roller axis. A second part of the coupling consists of a disk that is concentrically mounted on the shaft and contains bulges that essentially extend in the radial direction and face the pin. The pin is situated between two adjacent bulges such that one of the bulges acts upon the pin when the control knob is turned such that the roller is also turned. This measure is also intended to achieve proper functioning of the coupling if the axes of the roller and the shaft do not coincide exactly.

Other types of sensors, e.g., potentiometers or encoders, contain a sensor shaft that protrudes out of the sensor casing and concentrically extends to a threaded section that is integrally formed on the sensor casing. A control knob for actuating the sensor is directly mounted on the end of the sensor shaft which protrudes out of the threaded section. Sensors of this type can be mounted on a housing by inserting the threaded section through a bore in the housing and screwing a nut onto the threaded section such that the housing is clamped between the sensor casing and the nut. However, transverse forces may be transmitted to the sensor shaft when the control knob is actuated. This can lead to faulty signals in sensitive sensors.

SUMMARY OF THE INVENTION

Accordingly, an object of this invention is to provide an actuator/sensor assembly which can be easily mounted on a housing.

A further object of the invention is to provide such an actuator/sensor assembly wherein transverse forces which act upon the actuating element are prevented from being transmitted to the sensor shaft.

Another object of the invention is to provide such an actuator/sensor assembly which can be used in an operating handle for a motor vehicle control.

These and other objects are achieved by the present invention, wherein a sensor has a sensor casing from which projects a rotatable sensor shaft. The sensor casing has a threaded section which extends concentric to the sensor shaft and which can be inserted into an opening in a housing. A bearing member is screwed onto the threaded section in order to clamp the sensor casing and the bearing member to the housing. An actuator/control knob is coupled to the shaft and is rotatably supported on the bearing member and consequently on the housing. Transverse forces which act upon the knob are absorbed by the bearing member and transmitted to the housing. Thus, the sensor shaft is not subjected to lateral loads from the knob. A coupler means transmits rotational movements between the knob and the sensor shaft and compensates for eccentricities between the axis of rotation of the knob and the sensor shaft.

The threaded section has a groove which receives a tab which projects from the housing in order to prevent an undesired rotation between the sensor casing and the housing. The bearing member has an outer cylindrical surface that corresponds to an inner cylindrical surface of the knob in order to rotatably support the knob.

Preferably, the bearing member has a cylindrical projection that faces the sensor casing, with the bearing member being supported on the housing by this projection. In the assembled state, this projection extends through a recess in the end surface (or side wall) of the knob. In order to ensure that the actuating element is freely rotatable and does not jam in the assembled state, the projection is slightly longer than the thickness of the side wall.

The knob preferably includes a sleeve-shaped actuating wheel and a cover that can be fixed to the end surface of the actuating wheel. The wheel has an annular groove in a cylindrical inner surface, into which the outer edge of the cover is snapped. The cover has a tab which projects radially outward and into a notch in the wheel, so that cover and wheel rotate together. A coupler couples the cover to the sensor shaft. The coupler transmits rotational movements between the knob and the sensor shaft and simultaneously compensates for eccentricities between the axis of rotation of the knob and the sensor shaft so that no significant transverse forces act upon the sensor shaft.

The sensor shaft and a recess of the coupler, through which the sensor shaft extends, both have essentially D-shaped cross sectional shape. The radial play between the sensor shaft and the recess in the direction transverse to the straight surface of the D-shape is relatively minimal in this case such that only a slight rotational play results during the transmission of rotational movements. However, the radial play in the direction of the straight surface of the D-shape is sufficiently large in order to compensate for eccentricities between the actuating element and the sensor shaft.

The knob or the cover includes a axial projections which are spaced radially outwardly from a central axis of the knob or cover. These projections engages a recess in the coupler. This recess may, for example, be formed by protruding bulges arranged on both sides of the projections in the direction of rotation. Alternatively, the projections may be arranged on the coupler and the recess formed in the knob. A radial play is also provided between the projections and the recess in order to compensate for eccentricities between the knob and the sensor shaft which are caused by the manufacturing process.

In the circumferential direction, the projection and the recess are adapted to one another in such a way that the smallest rotational play possible occurs during the transmission of rotational movements. Preferably, two projections are arranged opposite to one another on the knob or on the cover. These projections engage two slot-shaped recesses in the circumferential surface of the coupler.

This actuator/sensor assembly may be used in connection with an operating handles, such as an operating handle for motor vehicle control. The operating handle housing includes an opening through which the sensor shaft and the threaded section extend, and the knob is supported on the operating handle housing by means of a bearing member. Preferably, the operating handle housing is essentially hollow and encloses the sensor. The sensor shaft and the threaded section of the sensor extend outward through the opening in the operating handle housing. A bearing member can be screwed onto the threaded section in order to mount the sensor on the operating handle housing.

DESCRIPTION OF THE PREFERRED EMBODIMENT

Figure 1:
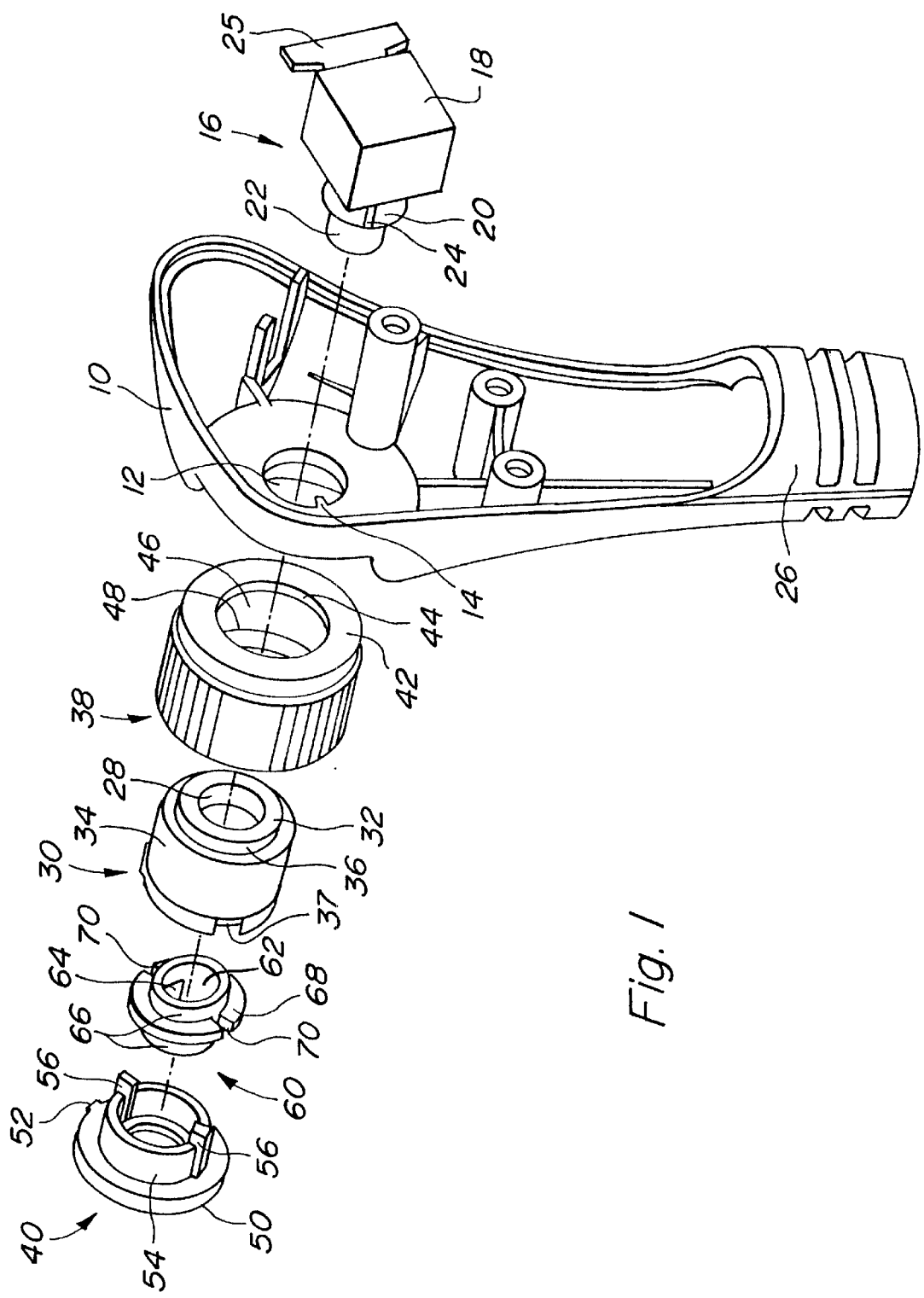
FIG. 1 is an exploded view showing part of an operating handle and with an actuator/sensor assembly according to the invention.
Figure 2:
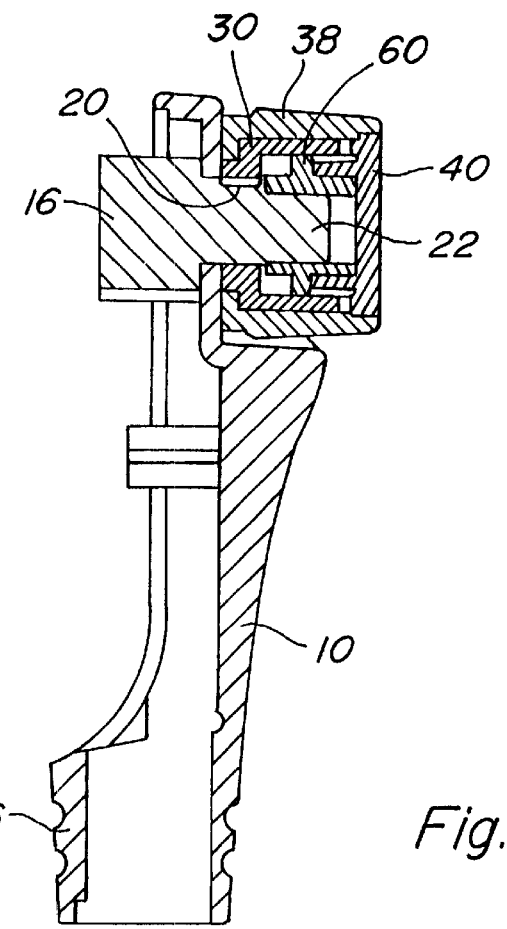
FIG. 2 is a sectional view of the assembly of FIG. 1.

FIG. 1 shows a housing portion 10 of a hollow housing of operating handle or operating lever for a motor vehicle control. A circular opening 12, in which a tab 14 protrudes radially inward, is arranged in the upper region of the housing 10. A sensor 16 includes a sensor casing 18, from which a threaded section 20 protrudes. A sensor shaft 22 extends concentric to the threaded section 20 protrudes from the threaded section 20 of the sensor 16.

An axial groove 24 which corresponds to the tab 14 in the opening 12 is arranged in the threaded section 20. During assembly, the threaded section 20 is inserted into the opening 12 in such a way that the axial groove 24 accommodates the tab 14 and thus prevents the sensor 16 from turning relative to the housing 10. In the mounted state, the sensor casing 18 is entirely situated within the operating handle. A printed-circuit board 25 laterally protrudes from the sensor casing 18. Electric wires (not shown) extend through the hollow shaft 26 of the operating handle.

The inside thread 28 of a sleeve-shaped bearing member 30 can be screwed onto the threaded section 20 of the sensor casing 18. The bearing member 30 has an end surface 32 that, in the mounted state, adjoins an outer side surface of the housing 10 in such a way that the housing 10 is arranged between the sensor casing 18 and the bearing member 30. The bearing member 30 also contains an outer cylindrical contact surface 34 and an adjacent cylindrical projection 36. Grooves 37 for guiding a tool when screwing the bearing member 30 onto the threaded section 20 of the sensor 16 are arranged on the side of the bearing 30 which is situated opposite to the end surface 32.

An actuating element or knob for the sensor 16 includes a manually actuated, sleeve-shaped actuating wheel 38 and a cover 40. The outside contour of the actuating wheel 38 is fluted so as to simplify its actuation. A circular bore 44 is formed in the front end portion 42 of the actuating wheel 38. The interior of the actuating wheel 38 has a cylindrical inner surface 46.

Viewing FIG. 1, during assembly, the bearing member 30 is inserted into the actuating wheel 38 from the left and screwed onto the threaded section 20 of the sensor casing 18. The axial thickness of the end portion 42 is slightly smaller than the length of the projection 36, so that the end portion 42 is provided with a certain play. The diameter of the bore 44 is slightly larger than the diameter of the projection 36, and the diameter of the inner surface 46 is slightly larger than the diameter of the contact surface 34. Due to these dimensions, the actuating wheel 38 is guided and supported by the bearing member 30 and can be freely rotated relative to the bearing member 30.

An annular groove 48 is formed in the inner surface 46 of the actuating wheel 38 at the end of wheel 38 which faces away from sensor 16. The groove 48 receives the outer edge 50 of the cover 40, and has a dimension such that the cover 40 can be pressed and snapped into the annular groove 48. A tab 52 radially projects from the outer edge 50 of the cover 40. In the mounted state, this tab is received by a corresponding recess or notch (not shown) in the actuating wheel 38, and thus prevents the cover 40 from turning relative to the actuating wheel 38, so that it is possible to transmit rotational movements.

A tubular projection 54 and two axially aligned arms 56 project axially from the inner side of the cover 40. Arms 56 are spaced radially from a central axis of the cover 40, and positioned diametrically opposite to each other.

A sleeve-shaped coupler or coupler 60 couples the cover 40 to the sensor shaft 22, transmits rotational movement, and compensates for eccentricities between the axis of rotation of the sensor shaft 22 and the other parts of the assembly.

Figure 3:
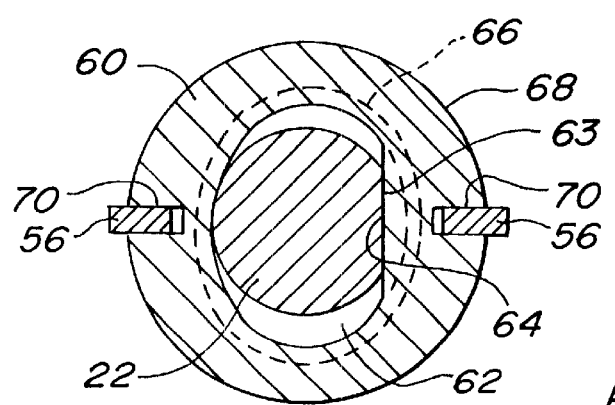
FIG. 3 is an enlarged cross sectional view through the bearing member and the sensor shaft of the present invention.

As best seen in FIG. 3, the sensor shaft (22) has a flat surface 63 on one side thereof, so that the sensor shaft has an essentially D-shaped cross sectional shape. Similarly, the wall of coupler bore 62 forms an oval with a flat surface 64, so that the wall of bore 62 also has an essentially D-shaped cross sectional shape. The sensor shaft 22 extends through the coupler bore 62. The surface 63 engages the flat surface 64, and the sensor shaft 22 and the coupler bore 62 are dimensioned to limit free play between the sensor shaft 22 and the coupler 60 in a direction perpendicular to the flat surfaces 63, 64, to permit free play in directions parallel to flat surfaces 63, 64, and so that shaft 22 and coupler 60 rotate together with minimal rotational play therebetween. The play in the direction parallel to the flat surfaces 63, 64 is large enough to compensate for an axial offset between the sensor shaft 22 and cover 40 and coupler 60.

The coupler 60 includes a hollow cylindrical body 66 and an integral ring-shaped collar 68 which projects radially outwardly from a central portion of the body 66. The body 66 can be partially mounted onto the projection 54 of the cover 40. Two opposing recesses or slots 70 are arranged in the outer surface of the collar 68 so that the slots 70 receive the arms 56 of the cover 40. The radial depth of the slots 70 ensures sufficient play for allowing radial movement between the arms 56 and the slots 70. As a result, axial offsets between the sensor shaft 22 and the actuating element 38 can be compensated. However, the play between the arms 56 and the slots 70 is minimal in the circumferential direction in order to ensure the smallest possible free travel during the transmission of rotational movements.

The major axis of the oval bore 62 is oriented 90 degrees with respect to a line connecting the slots 70. Consequently, the shape of the oval bore 62 permits compensation movement in a first radial direction while the slots 70 allows compensation movement in a second radial direction, perpendicular to the first direction. However, the rotational play remains relatively small.

Preferably, the bearing member 30 consists of metal, and the knob 38, 40 and coupler 60 consist of plastic. This allows economical manufacturing as well as reliable, wear-free interaction between the parts. The sensor 16 may be an encoder, the sensor shaft of which can be incrementally turned in both directions in an endless fashion to generate signal when turned. For example, a signal pulse is delivered during each incremental rotation. Encoders of this type frequently contain Hall sensors and are relatively susceptible to defects if transverse forces are transmitted to the sensor shaft.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A actuator/sensor assembly having a sensor coupled to an actuator and mounted on a housing, the sensor having a sensor shaft, the actuator being rotatably supported on the housing and a coupler which transmits rotational movement from the actuator to the sensor shaft and which accommodates misalignment between an axis of rotation of the actuator and the sensor shaft, wherein:

the sensor has a threaded section which extends concentric to the sensor shaft and which is received by an opening formed in the housing; and a bearing member is screwed onto the threaded section to retain the sensor on the housing, and the bearing member rotatably supports the actuator.

2. The actuator/sensor assembly of claim 1, wherein:

the threaded section has an axial groove formed therein, the axial groove receiving a tab which projects into the housing opening.

3. The actuator/sensor assembly of claim 1, wherein:

the bearing member comprises a cylindrical body which is rotatably received by the actuator.

4. The actuator/sensor assembly of claim 1, wherein:

the actuator has a bore formed in an end portion thereof; and the bearing member includes a cylindrical projection which extends through the bore and which is slightly longer axially than an axial the thickness of the end portion.

5. The actuator/sensor assembly of claim 1, wherein:

the actuator comprises a sleeve-shaped actuating wheel and a cover mounted on an end of the actuating wheel.

6. The actuator/sensor assembly of claim 5, wherein:

the actuating wheel has a cylindrical inner surface in which is formed an annular groove; and the cover has outer edge which snaps into said groove.

7. The actuator/sensor assembly of claim 5, wherein:

the cover has a tab that projects radially outwardly and which is received by a recess formed in actuating wheel.

8. The actuator/sensor assembly of claim 5, wherein:

the coupler is arranged between the sensor shaft and the cover.

9. The actuator/sensor assembly of claim 8, wherein:

the sensor shaft has a flat surface on one side thereof so that the sensor shaft has an essentially D-shaped cross sectional shape; and the coupler has a coupler bore extending therethrough, the bore having a wall with an essentially D-shaped cross sectional shape, the sensor shaft extending through said coupler bore, the sensor shaft and the coupler bore being dimensioned to limit free play between the sensor shaft and the coupler in a direction perpendicular to the flat surface, and to permit free play in directions parallel to said flat surface.

10. The actuator/sensor assembly of claim 1, wherein:

the actuator has a pair axially projecting arms spaced apart radially outwardly from a central axis of the actuator; and the coupler has a pair of slots which receive the arms.

11. The actuator/sensor assembly of claim 10, wherein:

the slots are formed in an outer surface of the coupler.

12. The actuator/sensor assembly of claim 1, wherein:

the bearing member is formed of metal and the actuator and coupler are formed of plastic.

13. The actuator/sensor assembly of claim 1, wherein:

the sensor is an encoder which generates signals in response to rotatation of the in sensor shaft.

14. The actuator/sensor assembly of claim 1, wherein:

the housing is part of an operating handle for motor vehicle control.

15. The actuator/sensor assembly of claim 14, wherein:

the operating handle is hollow and encloses the sensor.

* * * * *